United States Patent [19]
Souza et al.

[11] 3,973,352
[45] Aug. 10, 1976

[54] ANIMAL-RUN TRIGGER ASSEMBLY FOR ROTATING-FRAME TYPE ANIMAL TRAPS

[75] Inventors: Anthony J. Souza; J. Hibbard Robertson, both of Lititz, Pa.

[73] Assignee: Woodstream Corporation, Lititz, Pa.

[22] Filed: Sept. 22, 1975

[21] Appl. No.: 615,672

[52] U.S. Cl. .................................................. 43/92
[51] Int. Cl.² ........................................ A01M 23/26
[58] Field of Search .................................. 43/92, 93

[56]  References Cited
UNITED STATES PATENTS

| | | | |
|---|---|---|---|
| 1,738,448 | 12/1929 | Rollins | 43/92 X |
| 2,947,107 | 8/1960 | Lehn | 43/92 |
| 3,010,245 | 11/1961 | Conibear | 43/92 X |

FOREIGN PATENTS OR APPLICATIONS

| | | | |
|---|---|---|---|
| 6,962 | 4/2884 | United Kingdom | 43/93 |

*Primary Examiner*—Louis G. Mancene
*Assistant Examiner*—Daniel J. Leach
*Attorney, Agent, or Firm*—Holman & Stern

[57] ABSTRACT

An animal trap assembly comprising a rotating-frame type trap of the "Conibear" type in which a pair of similar frame members are pivotally connected on a common pivot axis, and are forcibly urged by actuator means operatively connected to the sides from a "set" position towards a "closed" position. The trap includes an assembly for forming an animal "run" having approaches at opposite sides, and in which the approaches include at least one of the transverse ends of the mutually pivoted similar frame members. The "run" forming assembly, includes plate members forming a relatively wide and upstream lever area in which slight impact will result in "triggering" the trap.

20 Claims, 9 Drawing Figures

ANIMAL-RUN TRIGGER ASSEMBLY FOR ROTATING-FRAME TYPE ANIMAL TRAPS

FIELD OF THE INVENTION

This invention relates generally to animal traps and more particularly to a rotating frame type animal trap utilized in conjunction with a separate trigger assembly defining an animal "run".

BACKGROUND OF THE INVENTION

The invention relates particularly to improvements in the actuating or foot tread trigger mechanism used with rotating frame type traps. By a rotating frame type trap, this refers to the trap which is often recognized as the "Conibear" trap in which a pair of similar frames, which may be of a generally square or rectangular shape, are pivotally connected at adjacent sides for relative rotation on a common axis to form by their pairs of sides pairs of co-acting jaws. At least one actuator, consisting of a coil spring having arms terminating in closed rings, has the rings slidable along and encircling one set of adjacent sides of the frames, and it is this actuator that is used to urge the jaws toward each other when the trap is sprung, and it is the actuator that maintains these jaws in a "closed" or locked position. In the patent to Conibear, 3,010,245, dated Nov. 28, 1961, such a rotating frame trap is described in which the sides cooperate with the rings and are shaped so that in the "set" position of the trap, these sides lie substantially parallel to each other, while the central portions of these sides near the common axis of the frame form a cross with each other within the rings on the arms of the coil spring or actuator. A trigger means (for example as described in the above-mentioned patent to Conibear or in the U.S. Pat. to Lehn, No. 2,947,107, issued Aug. 2, 1960), maintains the frames in an open position when the trap is "set", but when the trap is sprung, releases the frames so as to permit, as a result of the action of the spring and the rings on the ends, rapid rotation of the frames through an angle of about 90°, so that the jaws quickly strike and rapidly kill the animal in the trap.

A standard commercial trigger mechanism presently associated with rotating traps is described in the above-mentioned U.S. Pat. No. 2,947,107. Essentially, this patent describes a trigger mechanism comprising two prongs adapted to project inwardly toward the center of an open, "set" trap which prongs are fixedly connected to a sleeve rotatably connected to one of the ends of one of the frames of the trap. A bar rotatably mounted on the second frame on the end opposite the first sleeve bar, the trap is in the set position, has a notch therein adapted to releasably fit over the first frame to a slot in the sleeve, the bar thereby releasably holding the trap frames in open "set" position against the bars of the actuator. When the prongs are moved, for example, by an animal passing through the open trap "set" trap, they rotate the sleeve, the bar is thereby dislodged, permitting the trap to close; other notches, spaced along the bar, permit the adjusting of the pressure as desired. The trigger mechanism of the above-identified patent to Lehn suffers from disadvantages in that the two prongs projecting into the center of the trap act as a deterrent to animals passing through the trap since animals dislike pushing or brushing against projections because it makes noise and may damage their fur. Of course, the noise-creating feature is undesirable, since the animal will immediately react to the noise since it may warn their enemies or prey of their presence. Further, a two-prong trigger is not effective for all animals, for example, relatively large animals might push against the prongs and spring the trap before the animal got very far into the trap and accordingly the trap would be ineffective. Additionally, relatively small animals might slide around the ends of the prongs and thereby move through the trap without actuating the trap. Other disadvantages of trap-triggering mechanisms occur since this type of mechanism is subject to freezing due, for example, to moisture or rust impacting the relatively tight fit of the sleeve and the bar on the respective sides of the trap. Thus, the traps, at times, are ineffective. Moreover, when a rotating frame trap having large actuator springs, for strong initial striking power of the jaws, is used, the moving parts of the trigger mechanism have a tendency to bite into each other because of the extreme pressure present when the trap is "set", thus making it difficult to release the trap. However, prongs of a length too great to be practical, would be required to afford the necessary leverage to release the trap and overcome this problem. The various types of lever mechanisms or trigger mechanisms are used on rotating traps in addition to that of the U.S. Pat. to Conibear, No. 3,010,245, and the Lehn U.S. Pat. No. 2,947,107. For example, the additional prior art, of which the applicant is aware and believes to be pertinent, is as follows:

| | |
|---|---|
| Olson | 879,668 |
| Conibear | 2,068,656 |
| Taylor | 2,333,828 |
| Oberto | 2,741,065 |
| Glass et al | 3,120,958 |
| Conibear | 3,797,162 |
| Benz | 3,855,724 |

It is an object of the present invention to provide in combination with a rotating frame type animal trap, a trigger assembly cooperating with such a trap and defining an animal "run" which is likely to ensure that the animal will be in a vulnerable position with respect to the jaws or transverse ends of the trap when the trap is sprung. It is a further object of the invention to provide a novel trigger assembly defining the animal "run" in which a conventional "Conibear" rotating frame type animal trap can be converted to the type which conveniently defines an animal "run" and which is effective to trap and catch the animal and either hold it in a relatively harmless position and condition or rapidly kill the animal in a humane manner.

SUMMARY OF THE INVENTION

An improved treadle assembly used in combination with a rotating frame type animal trap is disclosed in which the treadle assembly includes means defining an increased actuating-lever-area making the normally effective rotatable frame type trap more versatile without loss of normal efficiency and effectiveness. More particularly, the present invention concerns a novel treadle assembly in combination with a pivotal or rotatable frame type trap generally identified as a "Conibear" type trap, in which the treadle assembly incorporates a plurality of displaceable plate members subject to a relatively slight impact for activating the trap from a "set" to a "closed" trapping condition, and which plates include abutments cooperating with transverse and/or impact members of the rotatable frame type trap.

A further object of the present invention is to utilize conventional rotating frame type traps which can be used in their conventional manner, i.e., without modification in a normal trapping situation, but are convertible to defining the type of trap usable in trapping situations where an animal "run" is normally found.

Still another object of the invention comprises integration of a treadle assembly, having an increased actuation-lever-area, and a rotatable frame-type trap by means of supports flanking the treadle assembly and trap and being hingedly and fixedly connected to the actuating-lever-areas of the treadle assembly, and hingedly but vertically-displacably supporting the rotatable frame trap so that it can be operated and "cocked" but yet comprise parts of an assembly which are not separable units.

DESCRIPTION OF THE DRAWINGS

These together with other more specific objects and features of the invention will become apparent when considered in detail with the following description of preferred embodiments when taken in conjunction with the drawings forming a part of the description, in which.

DESCRIPTION OF THE PREFERRED EMBODIMENTS

In the following description, various positional-directional terms such as "up", "down", "horizontal", "vertical", etc. are merely utilized for purposes of description and are not intended to restrict or imply restrictions in the operation or details of the invention.

Additionally, applicant incorporates by reference detailed descriptions of the rotating frame type trap of the patent to Conibear, 3,010,245, for example, and will merely describe details of the present invention which are sufficient to describe the structure and function of the treadle assembly in combination with the rotating frame type trap of the "conibear" type.

Figure 1:
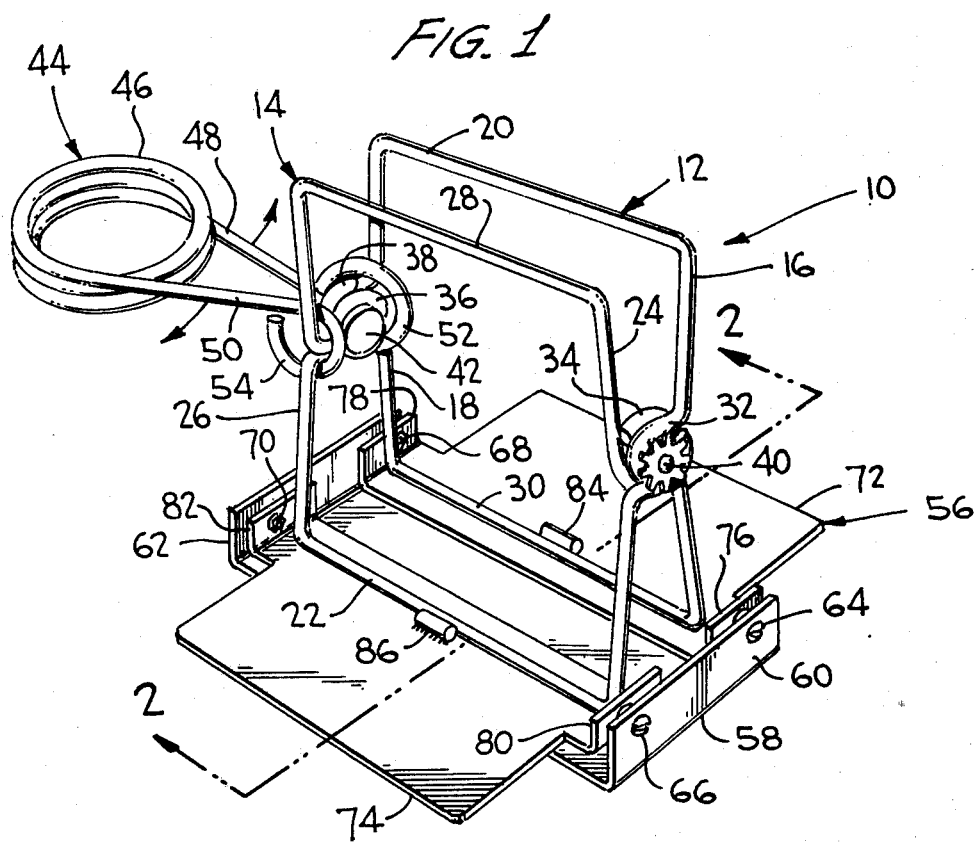
FIG. 1 is a perspective view of a novel trap ase assembly showing a rotatable frame type trap in a "set" condition on the novel treadle assembly of the invention.
Figure 2:
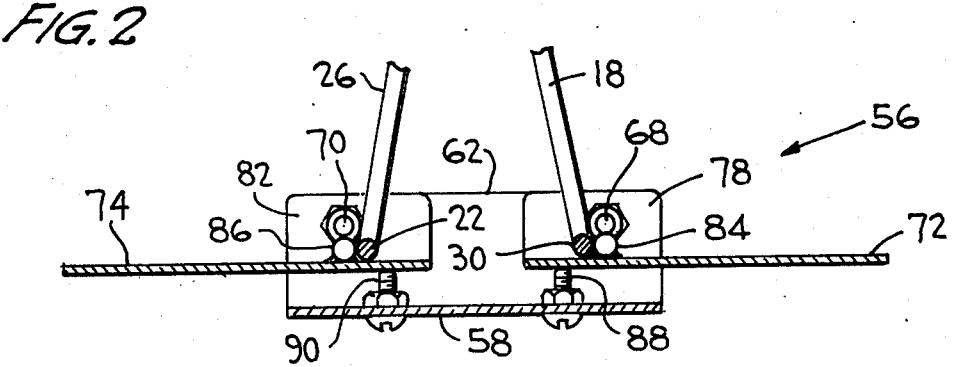
FIG. 2 is a fragmentary vertical section taken substantially on the plane of line 2—2 of FIG. 1.
Figure 3:
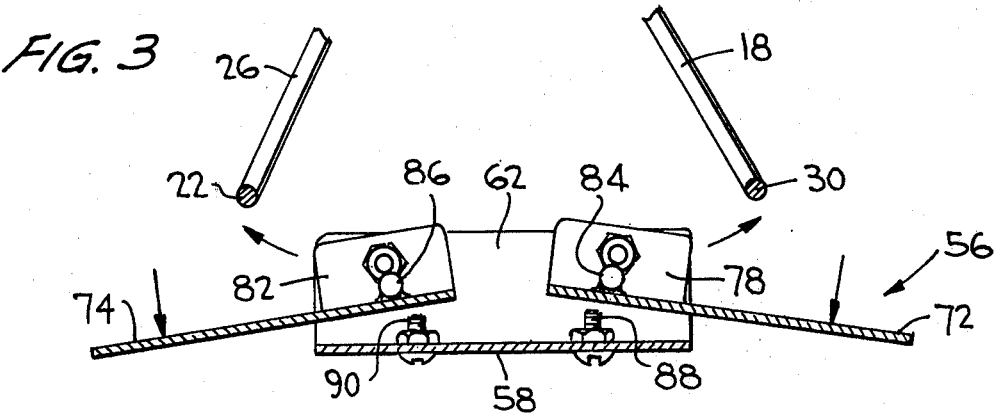
FIG. 3 is a diagrammatic section, similar to FIG. 2, showing the manner in which the trap is actuated from a "set" condition to an actuated or "closed" condition.

Referring to FIGS. 1–3, a rotating frame type animal trap is indicated generally at 10 and comprises frame members 12 and 14 which are generally rectangular or square, these frame members being produced from a suitably tempered steel, for example. The frame member 12 includes opposed sides 16 and 26, integral with transverse end members 20 and 22.

Likewise, the frame member 14 includes sides 24 and 18 integral with transverse ends 28 and 30.

The sides 16, 24 and 18, 26 are formed with suitable intermediate eye or pivot portions 32, 34 and 36, 38 which are retained in juxtaposed relation by means of suitable pivot or rivet elements 40 and 42, respectively.

Operatively connected to the sides 18, 26 of the respective frame members, for example, is an actuator indicated generally at 44. The actuator 44 comprises an intermediate power or actuating spring 46 which includes lever arms 48 and 50 which terminate in enlarged eye portions 52 and 54, respectively. As seen in FIG. 1, the arms 48 and 50 of the actuator 44 are under compression and are urged towards each other as is conventional in the rotating type trap. These arms are attempting to forceably move apart as indicated by the direction arrows therebetween. Likewise, the side members 18 and 26 are subject to outward pressure of the eyes 52 and 54 which are tending to move apart and forceably urge the respective ends 28, 22 and 20, 30 forcibly toward each other under the influence of the powerful actuator 44.

As mentioned above, the details of operation of the "Conibear" or rotating frame type animal trap are explained in detail in the Conibear patent 3,010,245, and the disclosure of this reference is incorporated by reference in this application.

The treadle assembly utilized in conjunction with the rotating frame trap 12 is indicated generally at 56 and comprises a base 58 which will rest on a support surface and which will generally define the "run" of the animal which one is seeking to trap.

The base 58 includes vertically extending side flanges 60 and 62 which have extended transversely therethrough spaced pivot elements 64, 66, and 68, 70. Pivotally mounted on the axially aligned pivot elements 64, 68 and 66, 70 are actuating-lever means 72 and 74, respectively, which comprise plate members defining a relatively large actuating-lever-area at opposite ends of the entrances to the trap which are disposed in the animal "run". The actuating lever means 72 and 74 respectively include transversely apertured ear portions 76, 78 and 80, 82, respectively. The pivot elements 64–70 extend through the apertured portions of the flanges 60, 62 and the pivot ears of the plate members or actuating-lever means 72 and 74. The plate members 72 and 74 respectively include integral with the upper surface thereof and inwardly of the pivot axis defined by the pivot elements abutments 84 and 86, respectively, which are engaged by the transverse ends 30 and 22, respectively, of the frame members 14 and 12, respectively.

As seen in FIG. 2, the base 58 has affixed thereto adjustable abutments 88 and 90, which engage the under surface of the actuating-lever means 72 and 76, respectively, and maintain the actuating-lever-area in a substantially horizontal position when the trap assembly is "set".

It should be immediately apparent that the standard latch and trigger assembly of the "Conibear" trap are not illustrated in FIG. 1. The reason is that these elements are unnecessary and would be omitted in manufacture, removed by the trapper, or inactivated by the trapper. To the extent that a description of these elements may be necessary, reference is had, particularly to the description of elements 5 and 6 in Lehn Pat. No. 2,947,107, which is embodied herein by reference in its entirety.

Referring to FIGS. 2 and 3, and to the former first, it is noted that the trap is in a "set" condition as seen in FIG. 2. When the trap is in this condition, the lower or transverse ends 22 and 30 are in engagement with the abutments 86 and 84, respectively, and are subject to the extreme pressure of the actuator arms 48 and 50 which are attempting to urge the sides 18 and 26, respectively, outwardly and the trap frames toward the "closed" condition. The resultant forces of the pivotal frame members, engaging the abutments 84 and 86, tend to urge the actuating-lever means, i.e., the relatively large actuating-lever-area upwardly as indicated by the direction arrows.

In the event a slight impact results on the upper surface of either of the actuating-lever means 72 or 74, see the direction arrows of FIG. 3, the ends 22 and 30 are dislodged from the abutments 86 and 84, permitting the actuating means to forceably and suddenly and immediately urge the transverse ends 20, 30 and 28, 22 of the rotating-frame type trap to move towards each other and into overlying relationship with respect to the relatively large actuating-lever-area where the animal is located and where he will be immediately killed in a humane manner.

Figure 4:
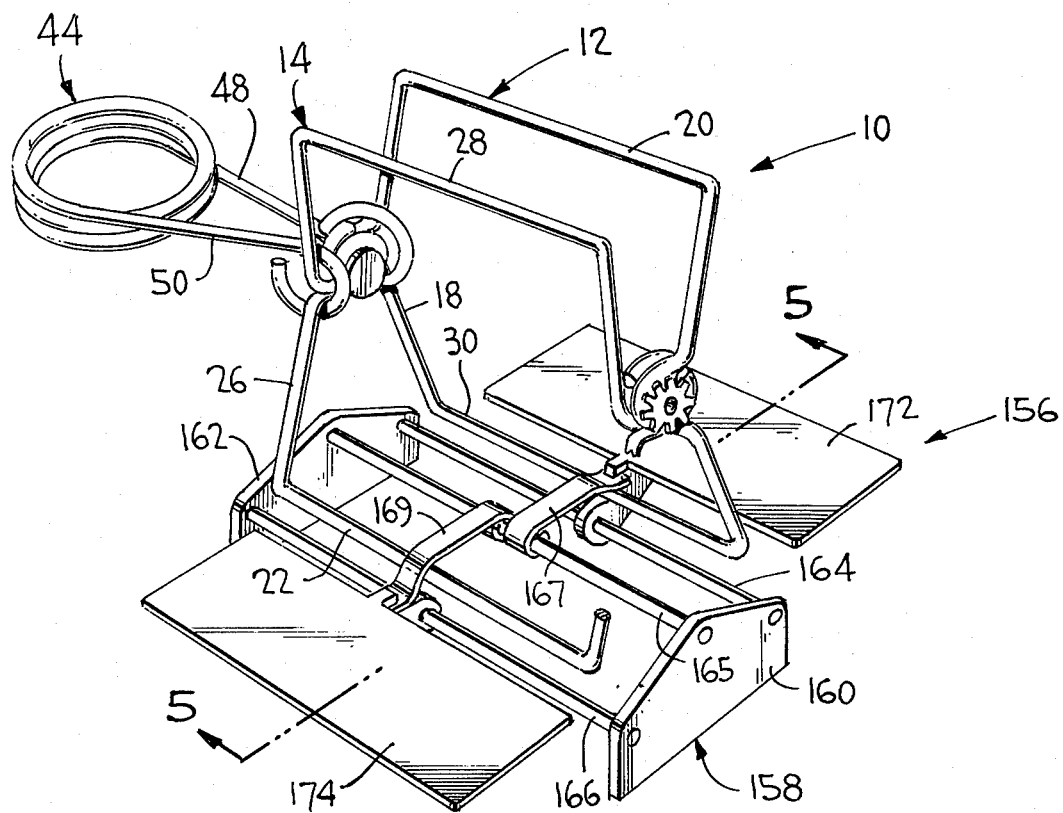
FIG. 4 is a perspective view, similar to FIG. 1, showing another embodiment of the novel treadle assembly, the trap being shown in a "set" condition.
Figure 5:
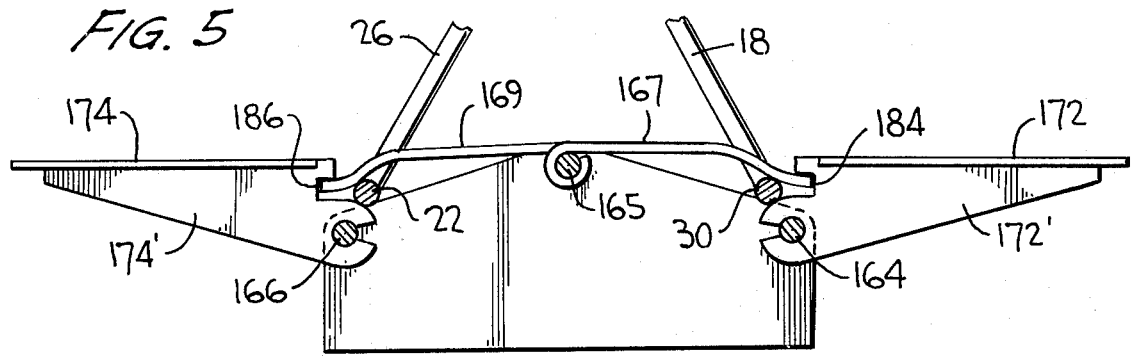
FIG. 5 is a vertical, fragmentary section taken substantially on the plane of line 5—5 of FIG. 4.
Figure 6:
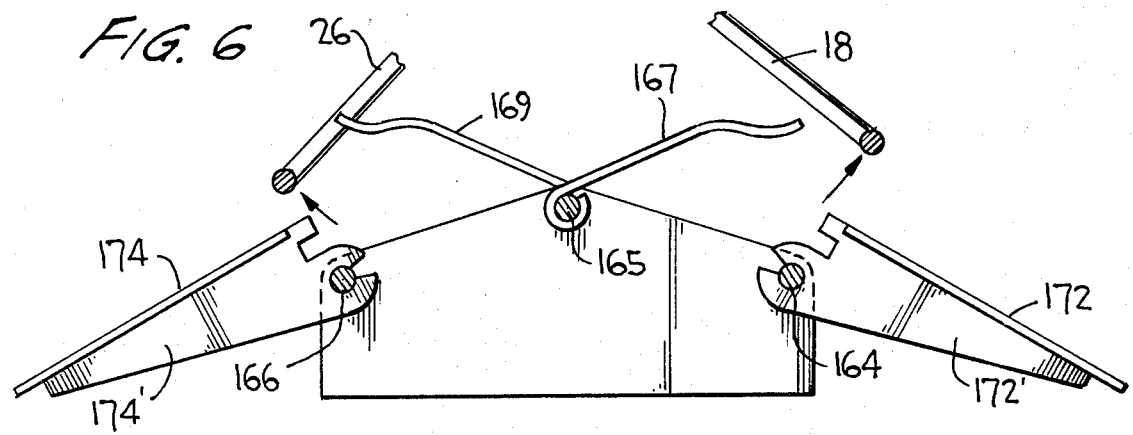
FIG. 6 is a diagrammatic section similar to FIG. 5, showing the trap in its actuated condition moving towards its "closed" condition.

Referring to FIGS. 4–6, a second treadle assembly is indicated generally at 156, and this treadle assembly is utilized with a rotating frame type animal trap indicated generally at 10 and comprising the same type as that which was described in detail with respect to FIGS. 1–3. In this regard, similar reference numerals will be utilized to identify the similar structure of the trap 10, while in the treadle assembly 156, similarly functioning elements will be identified, wherever possible, with similar reference numerals raised by 100.

The trap of FIGS. 4-5 is in a "set" condition. The treadle assembly 156 includes a base 158 comprising end plates 160 and 162 having secured thereto transverse pivot rods 164 and 166. Enlarged plates defining actuating-lever areas are provided by actuating-lever means 172 and 174, each of these lever means including integral with a lower surface portion thereof, see FIG. 5, mounting levers 172', 174', respectively, which are journalled on the pivot shafts 164 and 166, respectively. The plates 172 and 174 can be adjusted transversely of the pivot rods 164 and 166. Additionally, the levers 172' and 174' include inwardly projecting notch or abutment portions 184 and 186 which cooperate with dog elements as will subsequently be described.

The sides 160 and 162 have extending transversely therebetween an intermediate pivot element 165 which have pivotally mounted thereon dog elements 167 and 169 which will be disposed in the abutment notches 184 and 186, respectively, when the trap is "set".

It will be noted that the actuating-lever means 172 and 174 are disposed in a substantially horizontal position when the trap is "set", and the lower transverse ends 22 and 30 are positioned beneath the dogs 169 and 167, respectively, and are providing a force which is reacting on the overlying parts upwardly by virtue of the actuator 44, i.e., the arms 48 and 50 trying to move apart.

In the event that an animal approaches the "run" from one side or the other and displaces the actuating-lever means 172 or 174 downwardly, this immediately releases the spring-urged arms of the rotating frame type trap 10 resulting in the animal who has initiated actuation of the trap being either immediately trapped within the closing transverse ends 20, 30 or 28, 22, it being noted that these arms will pivot towards each other and immediately into the areas where the animal is located.

Figure 7:
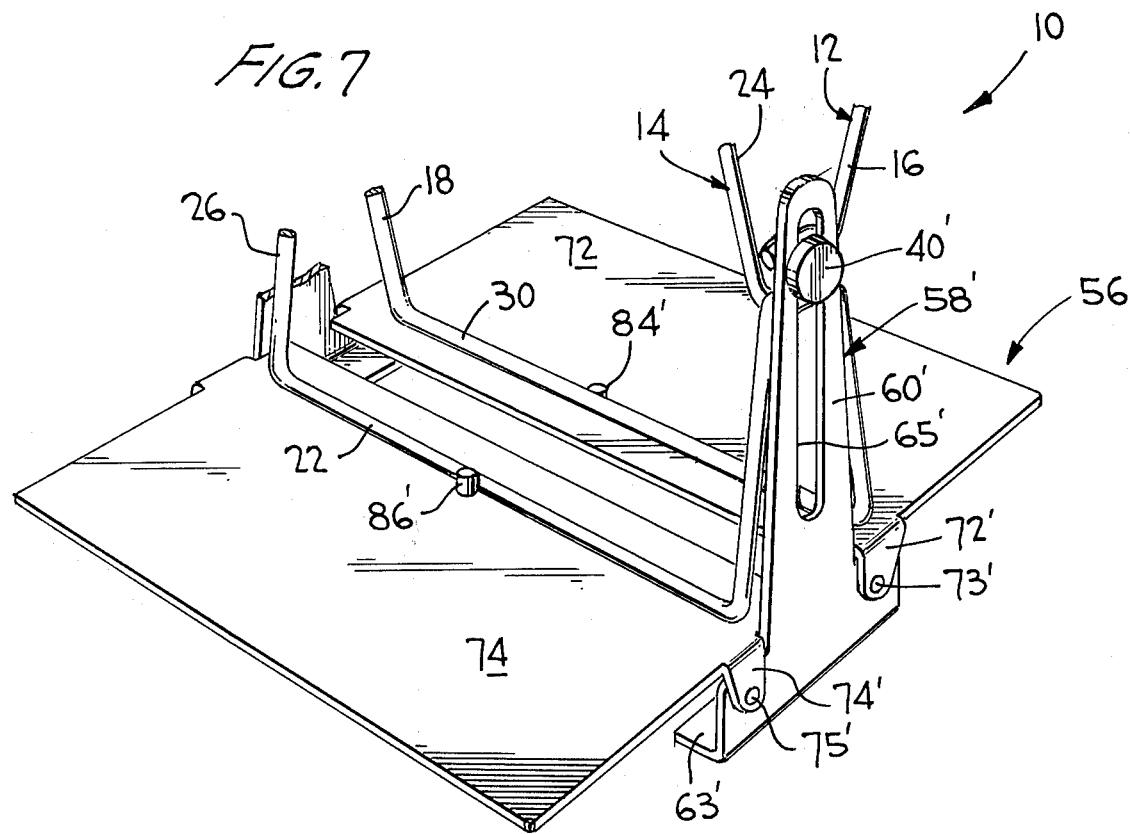
FIG. 7 is a fragmentary perspective view of another embodiment in which the treadle assembly, a rotatable frame-type trap and supports are assembled as a single trap unit.
Figure 8:
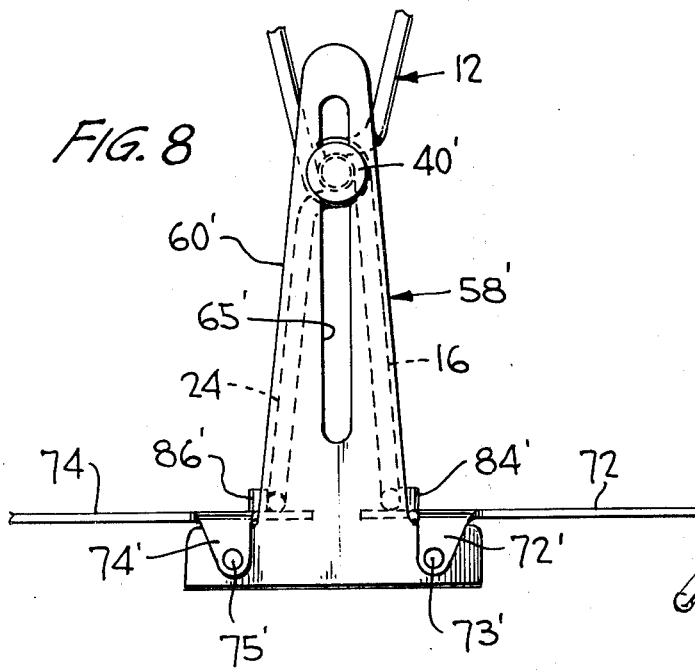
FIG. 8 is a side-elevational view of FIG. 7 showing the rotatable frame-type trap in its "cocked" condition.
Figure 9:
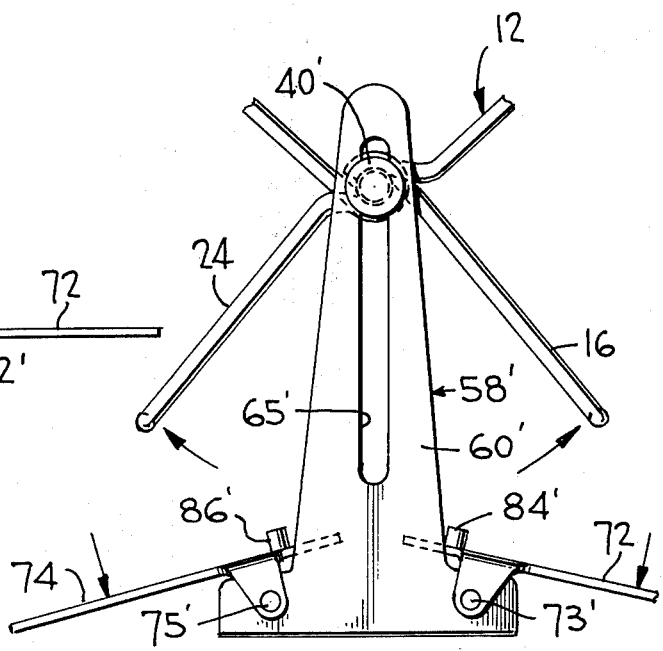
FIG. 9 is a side-elevational view, similar to FIG. 8, showing the trap in its actuated condition moving towards its "closed" condition.

Referring to FIGS. 7–9, where possible, reference numerals similar to those used in FIGS. 1–3 will be utilized for the purpose of identifying similarly functioning components. Indicated generally at 10 is a rotating frame type trap, shown fragmentarily, comprising frame members 12 and 14 which are generally rectangular or square. The frame member 12 includes opposed sides 16 and 26 integral with the lower transverse end member 22. Likewise, the frame member 14 includes sides 24 and 18 integral with a lower transverse end member 30. The sides are formed with suitable intermediate eye or pivot portions which are retained in juxtaposed relation by means of a suitable pivot or rivet element 40' (only one being shown on the closest side in FIG. 7).

The frame members are operatively connected to an actuator similar to that disclosed at 44 in FIG. 1, for example, and operation of the rotating frame type trap as previously been described in detail in the Conibear U.S. Pat. No. 3,010,245.

Indicated generally at 56 is a treadle assembly including actuating-lever means 72 and 74 comprising plate members defining a relatively large actuating-lever-area at opposite ends of the entrances to the trap as in the previously described embodiments. The lever means 72 and 74, as in the embodiment of FIG. 1, include vertically-extending abutments 84' and 86', respectively, which are engaged by the transverse ends 30 and 22, respectively, of the frame members 14 and 12, respectively, when the trap is "cocked" as seen in FIGS. 7 and 8.

Flanking opposite sides of the treadle assembly 56 and rotating frame trap 12 are support elements 58' (only one being shown). Each of the support elements 58' comprises a vertical plate 60' and an inwardly projecting foot portion 63'. The plate portion 60' has formed therein a vertically extending slot 65' which pivotally receives the rivet 40' and permits the frame trap 12 to be vertically displaced within the slot. Each of the actuating-lever means, i.e., plate members, 72 and 74 include at opposite side edges integral depending pivot ear portions 72' and 74', respectively, which are pivotally connected at 73' and 75', respectively, to underlying portions of the support 58'.

It will be seen that the treadle assembly 56 is pivotally but fixedly connected to the supports 58' through the pivot elements 73', 75' and pivot bar portions 72', 74', respectively. Further, the rotating trap 12 is pivotally but vertically displacably supported by the rivets 40' in the slot 65'.

Operation of the embodiment of FIG. 7 corresponds to that of FIG. 1–3. For example, downward force on the actuating lever-area defined by the respective plate member 72 or 74 results in the abutments 84' or 86' moving vertically and sufficiently to permit the jaws of the trap to spring outwardly under the force of the actuator as has been previously described with respect to FIGS. 1–3. "Cocking" of the trap is accomplished by overcoming the spring-force of the actuator 44 and positioning the lower bars 22 and 30 in parallel relationship inwardly of the respective abutment pins 86', 84'. The vertical slot 65' permits the transverse bars 22 and 30 to move downwardly relative to the treadle assembly to permit "cocking" of the trap.

Accordingly, within the scope of the invention, and as mentioned in the summary thereof, applicants have disclosed and described a novel treadle assembly which cooperates with the rotating frame type animal trap, accordingly providing a versatile and highly utilitarian trap which will enable the user to trap animals in a ready and expeditious as well as humane manner.

What is claimed is:

1. An animal trap assembly comprising in combination: a rotating-frame type trap including a pair of similar frame members, each having sides forming jaws and transverse ends therebetween, said frame members being pivotally connected intermediately of adjacent sides for relative rotation between set and closed positions about a common pivot axis extending transversely between the sides;

actuator means operatively connected to said sides of the frame members for forceably moving said transverse ends from said set position through pivotal movement about said pivot axis to said closed position and normally imposing closing force through said sides when the trap is set; and a treadle assembly having means for retaining the frame members in a set position in opposition to said actuator means when the trap is set, said treadle assembly comprising a base for resting on a support surface and defining an animal run therethrough which has two opposed approaches and includes one of each of a respective pair of the transverse ends of the respective frame members of the set trap, and actuating-lever means displaceably supported on said base and including an effective actuating-lever-area extending transversely and upstream of the respective approaches to the animal run defined by said base, said actuating-lever means including abutment means for engaging a respective transverse end of a respective frame member for normally absorbing the force of the actuator means of a set trap and positioning said actuating-lever-area in a triggering condition whereby minimal impact in the actuating-lever-area will displace the abutment means, release the transverse ends of the respective frame members, and permit the actuator means to forceably urge the transverse ends of the respective frame members toward a closing position projected toward each of the approaches to the animal run.

2. The structure as claimed in claim 1 in which said base includes transverse, elevated pivot means, said actuating-lever means comprising plate members pivotally mounted on said transverse, elevated pivot means.

3. The structure as claimed in claim 2 in which said base includes vertically extending side flanges having said transverse, elevated pivot means integral therewith.

4. The structure as claimed in claim 2 in which said base includes vertically extending abutment means disposed inwardly of said elevated pivot means and engageable beneath said plate members for orienting the plate members to a substantially horizontal position for receiving the transverse ends of the rotating-frame type trap.

5. The structure as claimed in claim 2 in which said plate members each include an integral abutment element projecting vertically from the upper surface thereof and comprising said abutment means for engaging a respective transverse end of a respective frame member.

6. The structure as claimed in claim 3 in which each of said plate members include upwardly extending pivot-ear portions pivotally mounted on said transverse, elevated pivot means.

7. The structure as claimed in claim 2 in which said abutment means comprises a dog-and-catch assembly operatively connected between said plate members and said base.

8. The structure as claimed in claim 7 in which said transverse, elevated pivot means comprises a pair of opposed transverse pivot rods upon which said plate members are vertically pivoted, and an intermediate rod parallel to those upon which the plate members are pivoted, said intermediate rod including pivotal latch elements detachably engageable with said plate members and displaceably receiving the transverse ends of the rotating-frame type trap therebeneath.

9. The structure as claimed in claim 1 in which said base comprises supports flanking said rotating frame-type trap and including means pivotally and vertically displacably connecting the trap to the supports, said actuating lever means being pivotally connected to said supports, and said rotating-frame-type trap actuator means, and treadle assembly, comprising a single non-separable unit.

10. The structure as claimed in claim 9 in which said supports comprise vertically extending plate portions, said plate portions including vertical slots therein, said rotating-frame type trap including pivot elements having a portion pivotally and vertically, displacable connected in said vertical slots.

11. The structure as claimed in claim 9 in which said base includes transverse, elevated pivot means, said actuating-lever means comprising plate members pivotally mounted on said transverse, elevated pivot means.

12. The structure as claimed in claim 11 in which said plate members each include an integral abutment element projecting vertically from the upper surface thereof and comprising said abutment means for engaging a respective transverse end of a respective frame member.

13. A treadle assembly for use with a rotating-frame type trap including a pair of similar frame members forming jaws and transverse ends therebetween, in which said frame members are pivotally connected intermediately of adjacent sides for relative rotation between set and closed positions about a common pivot axis extending transversely between the sides; said trap including actuator means operatively connected to said sides of the frame members for forceably moving said transverse ends from said set position through pivotal movement about said pivot axis to said closed position and normally imposing closing force through said sides when the trap is set, said treadle assembly comprising a base for resting on a support surface and defining an animal run therethrough which has two opposed approaches for including one of each of a respective pair of the transverse ends of the respective frame members of a set trap, and actuating lever-means displaceably supported on said base and including an effective actuating-lever-area extending transversely and upstream of the respective approaches to the animal run defined by said base, said actuating-lever means including abutment means for engaging a respective transverse end of a respective frame member for normally absorbing the force of the actuator means of a set trap and positioning said actuating-lever-area in a triggering condition whereby minimal impact in the actuating-lever-area will displace the abutment means, release the transverse ends of the respective frame members, and permit the actuator means to forceably urge the transverse ends of the respective frame members toward a closing position projected toward each of the approaches to the animal run.

14. The structure as claimed in claim 13 in which said base includes transverse, elevated pivot means, said actuating-lever means comprising plate members pivotally mounted on said transverse, elevated pivot means.

15. The structure as claimed in claim 14 in which said base includes vertically extending side flanges having said transverse, elevated pivot means integral therewith 16. The structure as claimed in claim 14 in which said base includes vertically extending abutment means disposed inwardly of said elevated pivot means and engageable beneath said plate members for orienting the plate members to a substantially horizontal position for receiving the transverse ends of the rotating-frame type trap.

17. The structure as claimed in claim 14 in which said plate members each include an integral abutment element projecting vertically from the upper surface thereof and comprising said abutment means for engaging a respective transverse end of a respective frame member.

18. The structure as claimed in claim 15 in which each of said plate members include upwardly extending pivot-ear portions pivotally mounted on said transverse, elevated pivot means.

19. The structure as claimed in claim 14 in which said abutment means comprises a dog-and-catch assembly operatively connected between said plate members and said base.

20. The structure as claimed in claim 15 in which said transverse, elevated pivot means comprises a pair of opposed transverse pivot rods upon which said plate members are vertically pivoted, and an intermediate rod parallel to those upon which the plate members are pivoted, said intermediate rod including pivotal latch elements detachably engageable with said plate members and displaceably receiving the transverse ends of the rotating-frame type trap therebeneath.

* * * * *